June 8, 1937.　　　　O. E. CLARKSON　　　　2,083,147
BASTING DEVICE FOR ROASTERS
Filed Jan. 27, 1936　　　　2 Sheets-Sheet 1
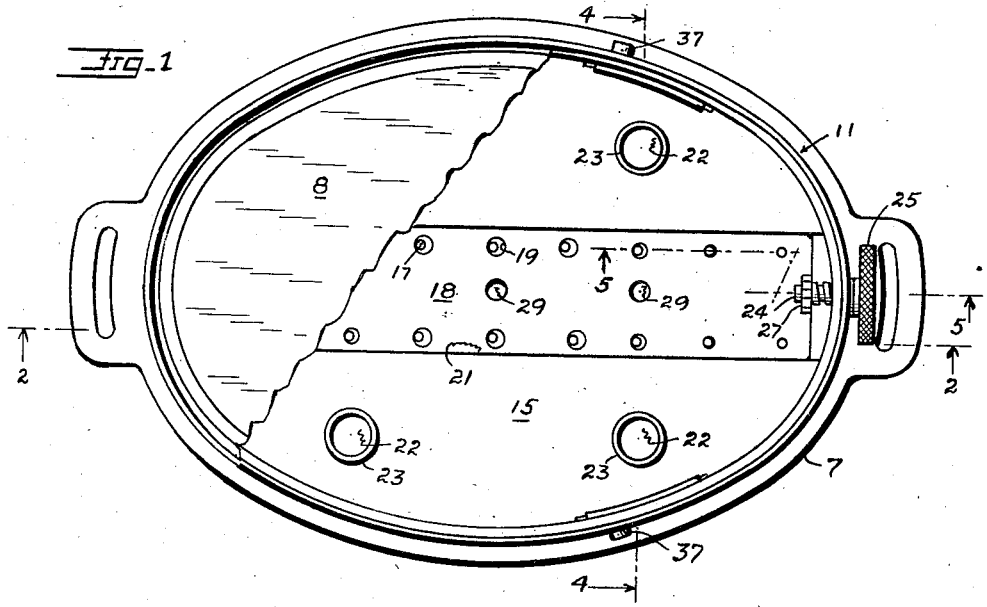
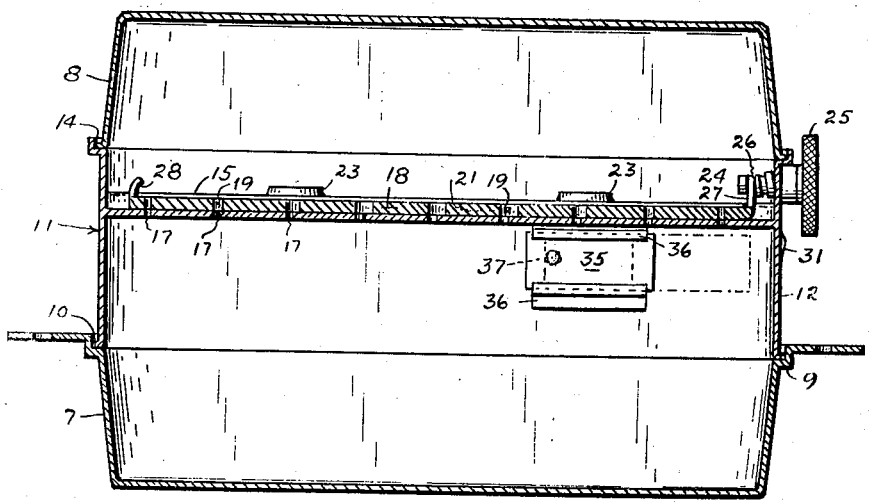
INVENTOR.
OCTAVIA E. CLARKSON
BY Henry N. Young
ATTORNEY June 8, 1937.  O. E. CLARKSON  2,083,147
BASTING DEVICE FOR ROASTERS
Filed Jan. 27, 1936   2 Sheets-Sheet 2
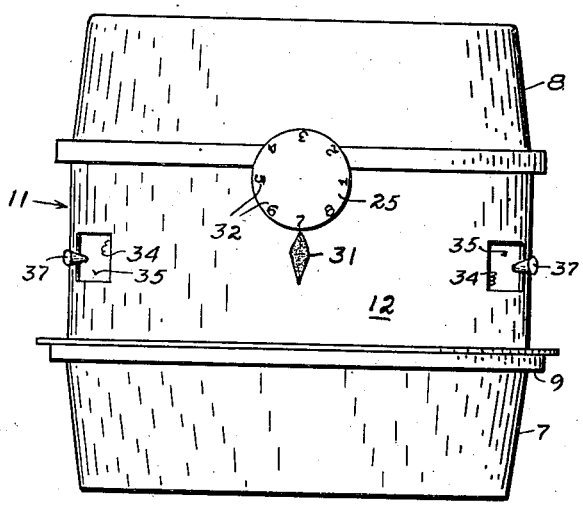
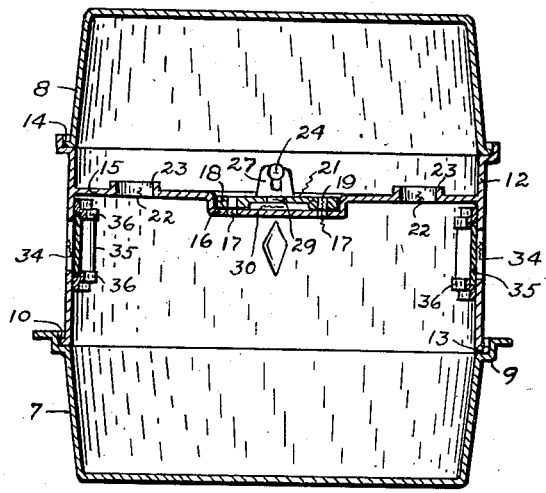
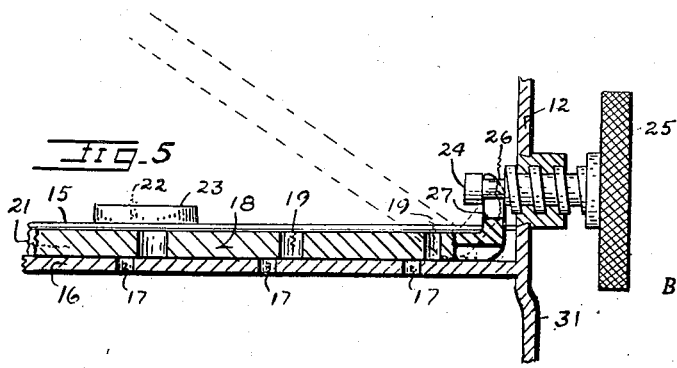
INVENTOR.
OCTAVIA E. CLARKSON
BY Henry N. Young
ATTORNEY Patented June 8, 1937

2,083,147

UNITED STATES PATENT OFFICE 2,083,147

BASTING DEVICE FOR ROASTERS

Octavia E. Clarkson, Santa Clara, Calif.

Application January 27, 1936, Serial No. 60,929

7 Claims. (Cl. 53—6)

The invention relates to a basting device for association with a roaster or other cooking utensil.

An object of the invention is to provide a basting device for optional use with present cooking utensils.

Another object is to provide an improved basting device which may be used for either constant or intermittent basting.

A further object is to provide for a regulated discharge of the basting liquid onto the material being cooked.

Yet another object is to provide a reservoir for the basting liquid wherein the liquid may be constantly kept at the cooking temperature.

The invention possesses other objects and features of advantage, some of which, with the foregoing, will be set forth or be apparent in the following description of a typical embodiment of the invention, and in the accompanying drawings, wherein, Figure 1 is a plan view of a roaster having the present basting device associated therewith, a major portion of the roaster cover being broken away.

Figure 2 is a longitudinal section taken generally at the line 2—2 in Figure 1.

Figure 3 is a front end elevation of the assembly of Figure 2.

Figure 4 is a sectional view at the line 4—4 in Figure 1.

Figure 5 is an enlarged and fragmentary section at 5—5 in Figure 1, a valve means of the device being shown in a different condition than in Figure 2.

As particularly illustrated, the device of present invention is associated with a usual type of roasting pan 7 having a cover or lid 8, said pan and cover normally cooperating to define the roasting space. The rim 9 of the pan 7 is stepped outwardly to provide a seat 10 for the rim of the lid 8 whereby the lid is adapted to be seated on the pan against its lateral displacement. In the present instance the pan and lid are of substantially equal depth from their open sides whereby each would provide approximately one half of the roasting space.

The basting device of the present invention comprises a unit 11 for interposition between roaster pan and lid elements. Accordingly, the unit 11 comprises a continuous wall 12 having its bottom rim 13 formed as the rim of the lid 8 for fitted engagement with the seat 10. At its top, the wall 12 is stepped outwardly to provide a seat 14 for fittedly receiving the cover rim.

At a level slightly below the top edge of the wall 12, the space defined within the wall is partitioned by means of a plate 15, whereby to define an open-topped reservoir or tray for the basting liquid in the upper portion of the unit. For descriptive convenience, the unit 11 may be referred to as a tray having its side wall continued below its bottom, the plate 15.

Centrally and longitudinally thereof, the plate 15 is formed with a rectangular depression having its bottom 16 provided with longitudinal rows of openings 17, said openings comprising discharge ports from the reservoir and being of like size in the present instance. An elongated valve member 18 is disposed in the plate depression for a limited and guided rectilinear reciprocation therein. Rows of holes 19 are provided through the member 18 for simultaneously registering with the openings 17 of the bottom depression 16 whereby the member 18 is operative as a slide valve for said openings. In Figures 1 and 2, the openings 19 are shown as in registration with the ports 17 whereby said ports are fully open for the discharge of liquid from the reservoir tray.

It will now be understood that any liquid in the reservoir will be retained therein when the openings 19 of the member 18 are out of registration with the plate openings 17. A disposal of the members 18 to more or less register the openings 19 with the ports 17 provides for the escape of the liquid from the reservoir at an adjusted rate. It will be noted that the plate depression 21 which receives the member 18 is arranged to function as a well or sump with respect to the entire reservoir space defined above the plate 15.

At points therein which are spaced from the depression 21, the plate 15 is provided with openings 22 which are defined by annular flanges or thimbles 23 extending upwardly from the plate. As shown, the thimbles 23 comprise struck-up portions of the plate 15 and extend only slightly above the upper part of the plate. Vapors arising from material being roasted in the pan are arranged to rise through the openings 22 and be condensed in the space above the plate 15 for supplying liquid basting material to the reservoir, it being noted that the height of the thimbles 23 is operative to limit the quantity of liquid which may be retained in the reservoir by functioning as overflow outlets for the reservoir.

Means are preferably provided for controlling the disposal of the valve member 18 from without the roaster and basting unit. As particularly shown, said means comprises a shaft or stem 24 which is threadedly engaged through the wall 12 and is arranged for a swiveled engagement with the member 18, whereby a rotation of the stem 24 will effect a longitudinal displacement of the member. The threaded wall opening receiving the stem 24 is preferably above the highest liquid level which is permitted for the reservoir whereby the basting liquid may not escape through it. The outer end of the stem 24 is provided with a knob 25 for manual manipulation to rotate the stem.

At its inner end, the stem 24 is formed with an annular groove 26, and a transversely extending forked extension 27 of the valve member 18 embraces the stem at said groove. The arrangement is such that the valve 18 may be readily removed from the unit 11 for the cleaning of the same, and may be as readily replaced for its control by the stem 24, this being indicated in the dotted line showing of Figure 5. If desired, a transverse extension 28 may be provided on the member 18 for facilitating its removal and replacement. It will be understood that the valve arrangement now described is particularly simple as to its form and number of parts, and facilitates a complete cleaning of the unit.

Longitudinally thereof and between the rows of openings 19, the slide valve member 18 is preferably grooved from its under side, and openings 29 extend upwardly through the member from the groove 30 thus provided; the present structural feature is brought out in Figures 1 and 4. This valve form minimizes the bearing surface for the valve and facilitates the distribution of the basting liquid at the valve for lubricating and sealing purposes thereat.

Since it is generally desirable that the greater amount of basting be effected centrally in a roaster, means are provided whereby the permitted discharge of heating liquid from the reservoir may be greatest at the center of the roaster and decrease gradually toward the ends of the valve. As is particularly illustrated, the valve openings 19 are largest centrally of the valve 18, and regularly decrease in size toward the valve ends. When the discharge openings for the reservoir tray are fully opened, as illustrated in Figure 2, the rearward sides of the openings 17 and 19 are arranged to be internally tangent. When the openings 17 are fully closed, as illustrated in Figure 5, the bores of the openings 17 and 19 are arranged to be externally tangent at the forward sides of the openings 17. In this manner, the effective liquid passages provided to the ports 17 as the valve member 18 is shifted to increase the discharge from the reservoir increase in size at rates which vary with the sizes of the different openings 19, it being noted that the full working stroke of the valve need be but little more than the diameter of the openings 17 and would seldom be employed.

For facilitating an exact and predetermined operative positioning of the valve 18, the outer faces of the knob 25 and of the wall 12 adjacent the knob may be provided with a suitable index scale means whereby the valve may be repeatedly set in the same relation to the openings 17. As illustrated in Figure 2, an index pointer 31 is defined and delineated on the wall 12, and a series of numerals 32 are provided on the outer face of the knob 25 for use with the pointer 31 in determining the rotative position of the knob with respect to the index 31.

To further facilitate an appropriate adjusted setting of the valve member 18, sight openings 34 are provided in the wall 12 at opposite sides of the valve and below the tray bottom 15. Shutter slides 35 engage the inner face of the wall 12 at the openings 34 for normal disposal across said openings and for temporary displacement to render the contents of the roaster visible, it being understood that most sight openings must be open to enable a person to clearly view the contents of the roaster through one opening. As particularly illustrated, the shutters 35 are engaged in parallel guideways 36 for their movements circumferentially of the unit 11.

Since the present roaster is oval in plan, the shutters 35 are longitudinally curved and may be advantageously formed of spring material whereby they tend to maintain a sealed engagement with the wall 12. Knobs 37 extend outwardly from the shutters 35 through the openings 34 for use in manipulating the shutters, it being noted that the knobs 37 may engage with opposite ends of the openings 34 as a stop means for limiting the movement of each slide between its extreme settings. This provision of the sight openings is understood to permit an examination of the cooking food as well as of the operativeness of the valve without necessitating the removal of the cover 8 and unit 11 with a resulting loss of heat and a halting of the cooking process.

While the disclosed unit 11 has been particularly designed for use with a particular form of roaster, it will be understood that said unit may be used with a roaster in which the cooking receptacle is chiefly provided in the pan portion. In the latter case, the wall 12 of the unit 11 might be of less height than that herewith shown, and the cover might be more or less flat. In any event, the clearance beneath the plate 15 is preferably no less than that which is provided when the cover is mounted directly on the pan, this being the relation shown in the drawings.

From the foregoing description taken in connection with the accompanying drawings, the advantages of the construction and method of operation will be readily understood by those skilled in the art to which the invention appertains. While I have described the features and method of use of a device which I now consider to be a preferred embodiment of my invention, I desire to have it understood that the showing is primarily illustrative, and that such changes may be made, when desired, as fall within the scope of the following claims.

I claim:

1. In combination with a roaster comprising a pan and a cover which are normally cooperative to define a closed roasting space, a basting attachment comprising a tubular element complementarily engaged with and between said pan and cover in fitted engagement therewith, a plurally perforated partition provided within and across said element and cooperative with the tubular wall of the element to define a reservoir for basting liquid thereabove, and valve means operative at the partition perforations to provide a controlled and distributed discharge of liquid from the reservoir and into the roasting space below the partition.

2. In combination with a food roaster comprising a pan and a cover which are normally cooperative to define a closed roasting space, a unitary basting attachment comprising a side wall member complementarily engaged with and between the edges of the pan and cover in fitted engagement therewith, a partition provided within and across said element and cooperative with the tubular wall of the element to define the bottom of a reservoir for basting liquid above the pan, an interior area of said partition being provided with a plurality of mutually spaced discharged openings therein, and a common valve operative at said openings to adjustably vary the effective size of the openings and thereby provide a controlled and distributed fluid flow from the reservoir and upon the contents of the pan.

3. In combination with a food roaster comprising a pan and a cover which are normally cooperative to define a closed roasting space, a unitary basting attachment including a tubular side wall member complementarily engaged and fitted with and between the said pan and cover, a partition integrally fixed within and across said member and providing the bottom of a reservoir for basting liquid and provided with a plurality of openings therethrough, valve means at a said opening for regulating the discharge of liquid therethrough, and a thimble extending solely upwardly from the unvalved opening of the partition into the reservoir space whereby said opening and thimble provide a passage for the convection rise of vapors from the roasting space into the reservoir space for condensation therein and the sleeve height determines the maximum depth of liquid in the reservoir.

4. A food roasting apparatus comprising a roasting pan, a tray for basting liquid supported on the pan in overlying spaced relation thereto and cooperative with the pan to define a closed roasting space beneath it, the bottom of said tray having a downwardly offset portion of uniform width and provided with a discharge opening, a slide valve mounted in said offset bottom portion for solely rectilinear reciprocation therein to control the discharge opening, a setting stem threadedly engaged in and through the side wall of the tray, and swivel connections between the valve and stem such that the valve and stem may be mutually engaged and disengaged while the stem is mounted in the tray wall.

5. A food roasting apparatus comprising a roasting pan, a tray for basting liquid supported on the pan in overlying relation thereto and cooperative with the pan to define a closed roasting space beneath it, the bottom of said tray having a discharge opening therethrough, a slide valve mounted on the tray bottom and operative at said opening, and means operative through a side of said pan for adjusting the setting of the slide valve with respect to the opening.

6. A food roasting apparatus comprising a roasting pan, a basting liquid tray having its side wall continuously produced below its bottom for complementary engagement with the pan rim to support the tray thereon and over the pan space, said tray having a discharge opening in its bottom, a valve operative at said discharge opening, a valve stem operative through the tray wall to adjust the setting of the valve, and means providing a shuttered sight opening in the tray wall portion below the tray bottom.

7. In combination with a closed food roaster, a partition sealedly extending across the roaster space and providing the bottom of a reservoir for basting liquid and provided with openings therethrough, valve means at a said opening for regulating the discharge of liquid therethrough, and a thimble extending upwardly from the unvalved opening of the partition into the reservoir space whereby said opening and thimble provide a passage for the convection rise of vapors from the roasting space into the reservoir space for condensation therein and the thimble height determines the maximum depth of liquid in the reservoir.

OCTAVIA E. CLARKSON.